US012713405B2

(12) United States Patent
Matsumoto et al.

(10) Patent No.: US 12,713,405 B2
(45) Date of Patent: Aug. 18, 2026

(54) WIRELESS COMMUNICATION SYSTEM AND WIRELESS COMMUNICATION METHOD

(71) Applicant: DENSO CORPORATION, Kariya-city (JP)

(72) Inventors: Sho Matsumoto, Kariya-city (JP); Youichi Hayase, Kariya-city (JP); Yuto Honda, Kariya-city (JP); Tadashi Nakashima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 307 days.

(21) Appl. No.: 18/659,270

(22) Filed: May 9, 2024

(65) Prior Publication Data

US 2024/0406934 A1 Dec. 5, 2024

(30) Foreign Application Priority Data

May 30, 2023 (JP) ................................ 2023-088790

(51) Int. Cl.
*H04W 72/02* (2009.01)
*H04W 72/0453* (2023.01)
*H04W 72/542* (2023.01)
*H04W 72/566* (2023.01)

(52) U.S. Cl.
CPC ....... *H04W 72/02* (2013.01); *H04W 72/0453* (2013.01); *H04W 72/542* (2023.01); *H04W 72/566* (2023.01)

(58) Field of Classification Search
CPC ............ H04W 72/02; H04W 72/0453; H04W 72/542; H04W 72/566; H04W 84/20
USPC .......................................................... 370/329
See application file for complete search history.

(56) References Cited

U.S. PATENT DOCUMENTS

| | | | |
|---|---|---|---|
| 6,122,291 A | 9/2000 | Robinson et al. | |
| 2005/0220135 A1 | 10/2005 | Honda et al. | |
| 2006/0089149 A1 | 4/2006 | Kizu et al. | |
| 2007/0195716 A1* | 8/2007 | Richter | G06F 13/4247 370/258 |
| 2013/0195036 A1* | 8/2013 | Quan | H04W 72/04 370/329 |
| 2020/0396688 A1* | 12/2020 | Hong | H04W 52/0261 |
| 2021/0066763 A1* | 3/2021 | Seon | H04W 4/70 |
| 2023/0319879 A1 | 10/2023 | Matsumoto et al. | |
| 2024/0284499 A1* | 8/2024 | Matsumoto | H04W 72/542 |

(Continued)

*Primary Examiner* — Robert J Lopata
(74) *Attorney, Agent, or Firm* — Posz Law Group, PLC

(57) ABSTRACT

A wireless communication system includes a master device and multiple slave devices. Each slave device executes a wireless communication with the master device using a communication channel sequentially selected from multiple communication channels. The wireless communication system is configured to: determine, in the wireless communication between the master device and each of the plurality of slave devices, a communication quality of each of the multiple communication channels; determine at least one target communication channel to be used for the wireless communication based on a determination result of the communication quality of each of the multiple communication channels; and repeatedly select, from the plurality of slave devices, an execution target of determination of the at least one target communication channel to be used for the wireless communication.

14 Claims, 8 Drawing Sheets

(56) References Cited

U.S. PATENT DOCUMENTS

2024/0298343 A1* 9/2024 Matsumoto ....... H04W 72/0453
2024/0314642 A1* 9/2024 Matsumoto ........... H04W 28/24
2024/0380446 A1* 11/2024 Kwon .................. H04L 1/0009

* cited by examiner

10

20 MASTER DEVICE

21 CNT
211 PROCESSOR
212 MEMORY
22 WC
23

30 SLAVE DEVICE

31 CNT
311 PROCESSOR
312 MEMORY
32 WC
33

FIG. 6

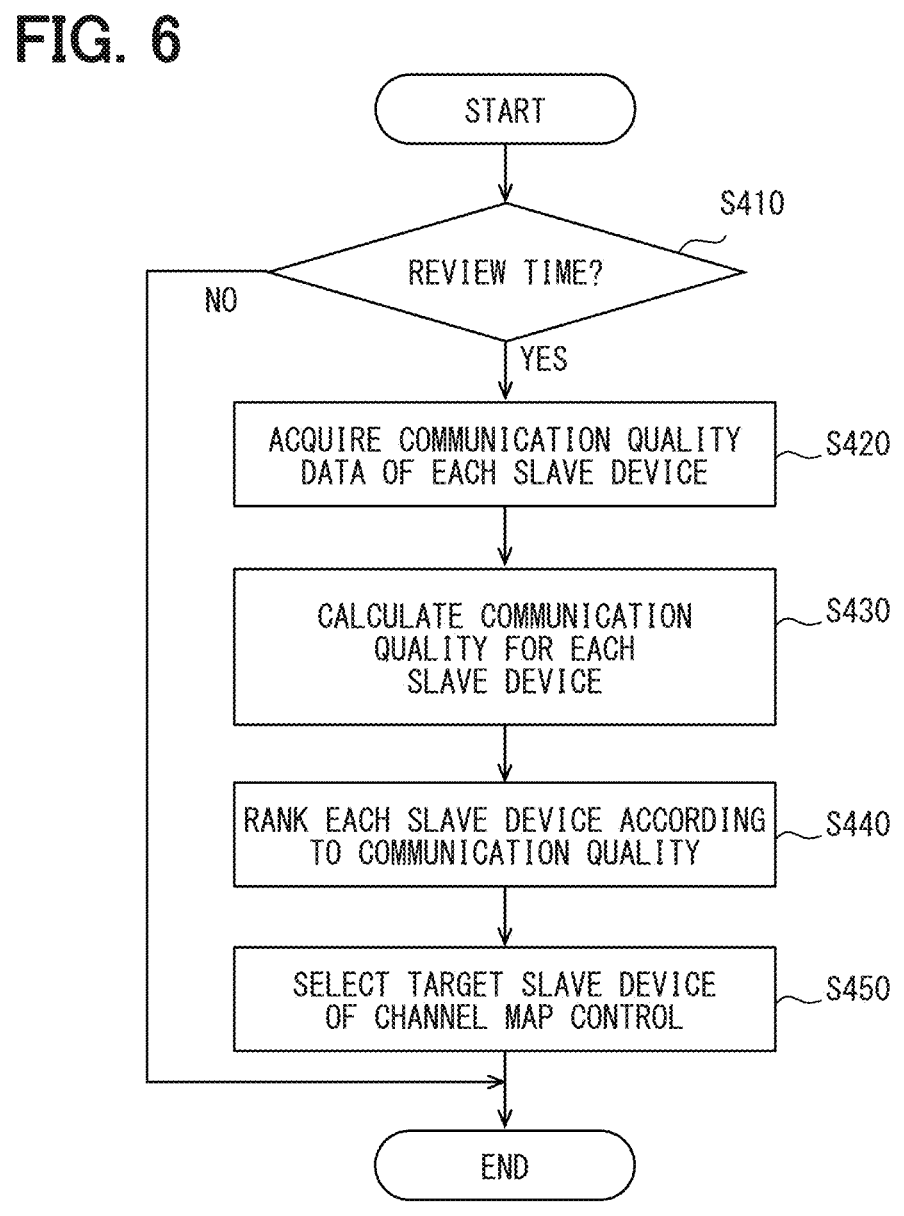

START
REVIEW TIME? (S410)
NO
YES
ACQUIRE COMMUNICATION QUALITY DATA OF EACH SLAVE DEVICE (S420)
CALCULATE COMMUNICATION QUALITY FOR EACH SLAVE DEVICE (S430)
RANK EACH SLAVE DEVICE ACCORDING TO COMMUNICATION QUALITY (S440)
SELECT TARGET SLAVE DEVICE OF CHANNEL MAP CONTROL (S450)
END

| SLAVE NO. | PER [%] | RSSI [dBm] | USABLE CHANNEL QUANTITY [ch] |
|---|---|---|---|
| S1 | 10 | -50 | 30 |
| S2 | 40 | -90 | 5 |
| S3 | 30 | -80 | 15 |
| S4 | 20 | -70 | 20 |

(b)

| SLAVE NO. | PER [%] | RSSI [dBm] | USABLE CHANNEL QUANTITY [ch] |
|---|---|---|---|
| S2 | 40 | -90 | 5 |
| S3 | 30 | -80 | 15 |
| S4 | 20 | -70 | 20 |
| S1 | 10 | -50 | 30 |

○ : PERFORM CHANNEL MAP CONTROL
× : DOES NOT PERFORM CHANNEL MAP CONTROL

M

S1

COMMUNICATION QUALITY : HIGH

S2

COMMUNICATION QUALITY : LOW

S3

COMMUNICATION QUALITY : LOW

S4

COMMUNICATION QUALITY : LOW

FIG. 10

| SLAVE NO. \ SWITCHING CYCLE | 1 | 2 | 3 | 4 | 5 | 6 | 7 |
|---|---|---|---|---|---|---|---|
| S1 | ○ | × | ○ | ○ | ○ | × | ○ |
| S2 | ○ | ○ | × | ○ | ○ | ○ | × |
| S3 | ○ | ○ | ○ | × | ○ | ○ | ○ |
| S4 | × | ○ | ○ | ○ | × | ○ | ○ |

WIRELESS COMMUNICATION SYSTEM AND WIRELESS COMMUNICATION METHOD

CROSS REFERENCE TO RELATED APPLICATION

The present application claims the benefit of priority from Japanese Patent Application No. 2023-088790 filed on May 30, 2023. The entire disclosure of the above application is incorporated herein by reference.

TECHNICAL FIELD

The present disclosure relates to a wireless communication system and a wireless communication method for executing wireless communication between a master device and a slave device via one communication channel, which is sequentially selected from multiple communication channels.

BACKGROUND

There has been known a wireless communication system that executes wireless communication between a master device and a slave device via one communication channel, which is sequentially selected from multiple communication channels.

SUMMARY

A wireless communication system includes a master device and multiple slave devices. Each slave device executes a wireless communication with the master device using a communication channel sequentially selected from multiple communication channels. The wireless communication system is configured to: determine, in the wireless communication between the master device and each of the plurality of slave devices, a communication quality of each of the multiple communication channels; determine at least one target communication channel to be used for the wireless communication based on a determination result of the communication quality of each of the multiple communication channels; and repeatedly select, from the plurality of slave devices, an execution target of determination of the at least one target communication channel to be used for the wireless communication.

BRIEF DESCRIPTION OF DRAWINGS

Objects, features and advantages of the present disclosure will become apparent from the following detailed description made with reference to the accompanying drawings. In the drawings:

FIG. 6 is a flowchart showing a process of selecting a slave device as a target of channel map control in a first embodiment;

FIG. 7 is a schematic diagram for explaining the process shown in the flowchart of FIG. 6;

FIG. 10 is a schematic diagram for explaining the process shown in the flowchart of FIG. 8.

DETAILED DESCRIPTION

Figures 1, 2:
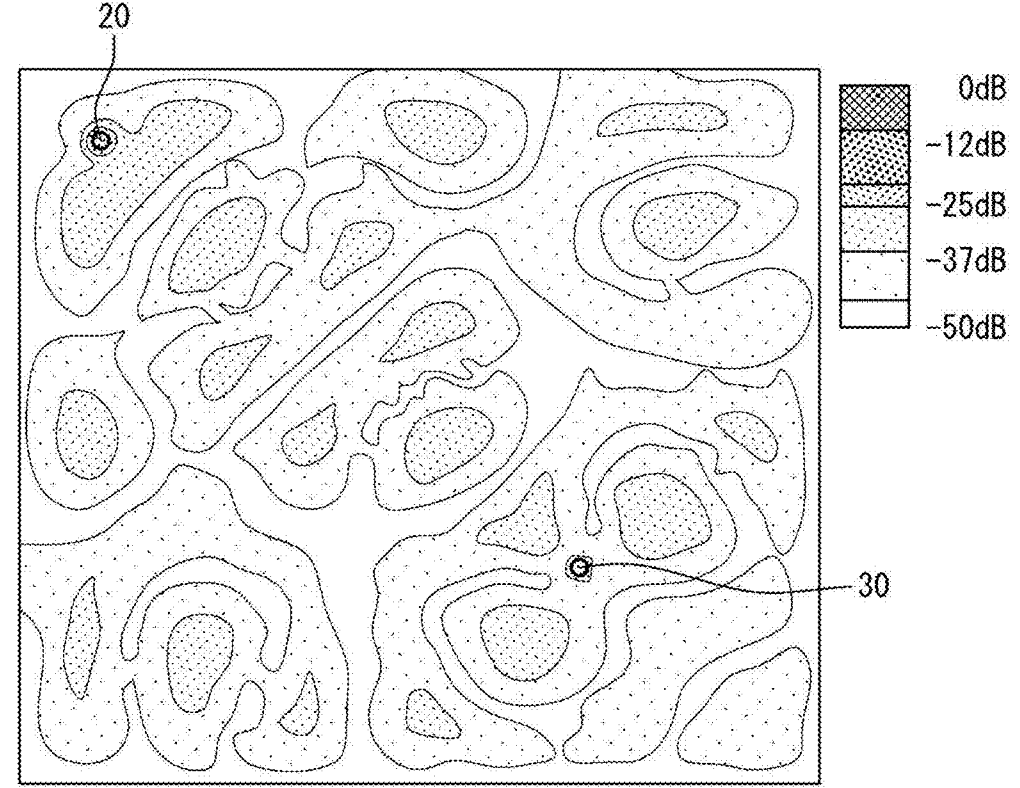
FIG. 1 is a block diagram showing a schematic configuration of a wireless communication system according to an embodiment of the present disclosure.
FIG. 2 is a diagram showing an example of electric field intensity distribution in a communication environment between a master device and a slave device.

In a wireless communication performed between a master device and a slave device via one communication channel, which is sequentially selected from multiple communication channels, when a packet error occurs and an RSSI value of radio signal of the packet is greater than a preset threshold Th1, the wireless communication system determines that a reception operation of the packet is a reception error caused by interference with another radio wave. Then, the number of receptions and the number of reception errors are counted, and the frequency (the number of reception errors/the number of receptions) of reception errors caused by interference in each frequency channel is recorded. When the reception error frequency exceeds a threshold Th2, the system determines that an interference source exists in the frequency channel for which the reception error frequency is determined to exceed the threshold Th2, and this frequency channel is stored as an unusable channel.

As described above, a frequency channel having a deteriorated communication quality due to interference with other radio waves is set as an unusable channel. The wireless communication system resets the frequency channel set as the unusable channel to a usable channel in response to elapse of a predetermined period from the setting of unusable channel. Hereinafter, such control for setting a frequency channel as the unusable channel or resetting the unusable channel to the usable channel is referred to as channel map control.

The wireless communication system includes at least one master device and at least two or more slave devices. Each slave device performs wireless communication with the master device. In this configuration, it is necessary to perform channel map control for each slave device. The channel map control is mainly executed in software manner by executing a program using a computer, which includes a processor. Therefore, as the number of slave devices increases, a processing load of the computer for channel map control increases accordingly. Therefore, when the channel map control is performed for all of the slave devices, it is necessary to use high-performance computer, which may increase the cost of wireless communication system.

According to an aspect of the present disclosure, a wireless communication system includes a master device; multiple slave devices, each of which executing a wireless communication with the master device using a communication channel sequentially selected from multiple communication channels; a communication channel determination unit determining, in the wireless communication between the master device and each of the multiple slave devices, a communication quality of each of the multiple communication channels, the communication channel determination unit determining at least one target communication channel to be used for the wireless communication based on a determination result of the communication quality of each of the multiple communication channels; and a selection unit selecting, from the multiple slave devices, an execution target of communication channel determination performed by the communication channel determination unit. The selection unit repeatedly selects, from the multiple slave devices, the execution target of communication channel determination.

According to another aspect of the present disclosure, a wireless communication method executes a wireless communication between a master device and multiple slave devices. Each of the multiple slave devices executes a wireless communication with the master device using a communication channel sequentially selected from multiple communication channels. The wireless communication method includes: determining, in the wireless communication between the master device and each of the multiple slave devices, a communication quality of each of the multiple communication channels; determining at least one target communication channel to be used for the wireless communication based on a determination result of the communication quality of each of the multiple communication channels; and repeatedly selecting, from the multiple slave devices, an execution target of determination of the at least one target communication channel to be used for the wireless communication.

As described above, in the wireless communication system and the wireless communication method according to the present disclosure, determination of communication quality of each communication channel and determination of communication channel based on the determination result are not performed for entire slave devices at the same time. Instead, partial slave device(s) is selected as execution target and the communication channel to be used is determined based on the determination result of communication quality of communication channel selected as the execution target. Therefore, even when the master device communicates with multiple slave devices, the processing load for determining the communication channel can be reduced. Thus, it is possible to avoid an increase in system cost by avoiding use of a high-performance computer.

The selection of slave device executing determination of communication channel based on the determination result of communication quality of each communication channel is repeatedly performed. Therefore, the slave device selected as the execution target of channel map control is not fixed to a specific slave device and can be properly changed. Therefore, it is possible to suppress the occurrence of a situation in which only a specific slave device is excluded from the execution target of the communication channel determination, and thus communication with the master device is continuously performed via the communication channel having deteriorated communication quality. Thus, it is possible to ensure the effectiveness of the channel map control.

The following will describe embodiments of the present disclosure with reference to the drawings. Note that the same or similar components are denoted by the same reference symbols throughout the drawings, and description thereof may be omitted. When only a part of the configuration is described in each embodiment, the configurations of other embodiments described above can be applied to other parts of the configuration. In addition to the combination of the configurations explicitly described in the description of each embodiment, the configurations of multiple embodiments may be partially combined even if not explicitly described as long as there is no difficulty in the combination.

First Embodiment

The wireless communication system of the present embodiment includes at least one master device and at least two slave devices. Each of the at least two slave devices wirelessly communicates with the at least one master device. The master device or the multiple slave devices may be mounted on a moving object. Examples of the moving object may include a vehicle such as an automobile or a railway vehicle, a flying object such as an electric vertical take-off and landing aircraft or a drone, a ship, a construction machine, and an agricultural machine.

As a specific application to a vehicle, the wireless communication system according to the present embodiment may be applied to a battery management system that manages a battery mounted as a battery pack in an electrically driven vehicle, such as an electric vehicle, a hybrid vehicle, or a plug-in hybrid vehicle. When applied to the battery management system, the master device is connected to a battery control device, and multiple slave devices are respectively connected to monitoring devices, which are respectively provided to multiple battery stacks included in the battery pack. In this case, the master device and the multiple slave devices are mounted on the vehicle.

Each monitoring device provided for each battery stack acquires battery information, such as a voltage and a current of each battery cell included in the corresponding battery stack and a temperature of the battery stack using various sensors. Upon receiving data that requests battery information from the battery control device via the wireless communication system, each monitoring device transmits the acquired battery information to the battery control device via the wireless communication system. Based on the acquired battery information, the battery control device calculates a state of charge (SOC) of the entire battery stack, drives the temperature raising/cooling mechanism in order to adjust the temperature of battery pack to an appropriate range, and determines whether it is necessary to execute an equalization process for equalizing the voltages of battery cells. In response to determining that the equalization process needs to be executed in at least one battery stack, the battery control device instructs the corresponding monitoring device to execute the equalization process via the wireless communication system. Each monitoring device performs a process for determining an abnormality occurred in various sensors or an abnormality occurred in the operation of monitoring device, and transmits abnormality information to the battery control device via the wireless communication system in response to determining occurrence of abnormality.

As another example, the wireless communication system according to the present embodiment may be applied to a smart key system or a tire pressure monitoring system of a vehicle. When the wireless communication system is applied to the smart key system, the master device is mounted on the vehicle and is connected to a control device. The control device may control locking and unlocking of a vehicle door. The control device may control turning on and turning off of a traveling power source, such as an engine of the vehicle. The multiple slave devices are mounted on portable keys or portable terminals possessed by users. When the master device is applied to the tire pressure monitoring system, the master device is mounted on the vehicle, and is connected to a control device, which displays a tire pressure and outputs a warning in response to detecting an abnormal tire pressure. The multiple slave devices are attached to respective tires of the vehicle. Each slave device is connected to an air pressure detection device attached to the corresponding tire.

The wireless communication system according to the present embodiment may be applied to a vehicle diagnosis system. In this case, multiple slave devices are connected to multiple in-vehicle devices each having a self-diagnosis function. The master device is connected to a diagnosis control device installed in a service factory. In these examples, at least one of (i) the master device or (ii) the multiple slave devices is disposed at a fixed position, and/or at least one of (i) the master device or (ii) the multiple slave devices is mounted on the vehicle.

An application example of the wireless communication system according to the present embodiment is not limited to a vehicle. As described above, the wireless communication system can also be applied to a system that controls and manages various equipment, such as a moving object other than a vehicle, for example, a flying object such as a drone, a ship, a construction machine, or an agricultural machine. The wireless communication system according to the present embodiment can also be applied to a system that controls and manages various equipment of a building or production facilities of a factory.

FIG. 1 is a block diagram illustrating a schematic configuration of a wireless communication system 10. In this example, both of the master device 20 and the slave device 30 included in the wireless communication system 10 are mounted on, for example, a vehicle (automobile). In this example, the master device 20 and the slave device 30 may be arranged in a common housing or may be arranged separate from one another. The number of master devices 20 may be one or more. When multiple master devices 20 are provided, each of the multiple master devices 20 may communicate with all of the multiple slave devices 30 belonging to different groups. Alternatively, each of the multiple master devices 20 may communicate with all of the multiple slave devices 30 belonging to the same group. The master device 20 and the slave device 30 perform wireless communication via one communication channel sequentially selected from multiple communication channels using a specific communication method, such as Bluetooth Low Energy communication. Bluetooth is a registered trademark, and is referred to as Bluetooth LE hereinafter.

As an example, the wireless communication system 10 of the present embodiment includes one master device 20 and multiple slave devices 30. In FIG. 1, only one slave device 30 is illustrated for simplicity purpose of illustration. The multiple slave devices 30 may have the same configuration with one another.

In the wireless communication between the master device 20 and the slave device 30, for example, a frequency band of 2.4 GHz band or a 5 GHz band may be used for short-range communication. Radio waves in such a high frequency band tend to travel more straightly than radio waves in the LF band and are more likely to be reflected by a metal object such as a body of a vehicle. LF is an abbreviation for Low Frequency. For example, Bluetooth, Bluetooth LE, or the like can be adopted as the short-range communication standard. As an example, the master device 20 and the slave devices 30 of the present embodiment are configured to be able to perform wireless communication (hereinafter referred to as Bluetooth LE communication) conforming to the Bluetooth LE standard. Details of the communication method related to the communication connection, the encrypted communication, and the like are performed according to a sequence defined by the Bluetooth LE standard.

As illustrated in FIG. 1, the master device 20 includes a control circuit (CNT) 21, a wireless communication circuit (WC) 22, and an antenna 23. In addition to the above-described components, the master device 20 includes an input/output interface and a bus line for communicating with devices other than the slave device 30 in a wired or wireless manner.

The control circuit 21 is implemented by a computer, which includes a processor 211 and a memory 212. The memory 212 includes, for example, a RAM and a ROM. RAM is an abbreviation for Random Access Memory. ROM is an abbreviation for Read Only Memory.

In the control circuit 21, the processor 211 executes a predetermined process (control) by executing a program stored in the ROM while using the RAM as a temporary storage area. The processor 211 includes multiple functional units that are provided by executing multiple instructions included in the program. The program storage medium is not limited to the ROM. For example, various storage media such as an HDD and an SSD can be adopted. HDD is an abbreviation for Hard Disk Drive. SSD is an abbreviation for Solid State Drive.

The processor 211 is, for example, a CPU, an MPU, a GPU, or a DFP. CPU is an abbreviation for Central Processing Unit. MPU is an abbreviation for Micro-Processing Unit. GPU is an abbreviation for Graphics Processing Unit. DFP is an abbreviation for Data Flow Processor. The control circuit 21 may be implemented by combining multiple types of arithmetic processing devices such as a CPU, an MPU, and a GPU. Alternatively, the control circuit 21 may be implemented by an SoC. SoC is an abbreviation for System on Chip. The control circuit 21 may be implemented by using an ASIC or an FPGA. ASIC is an abbreviation for Application Specific Integrated Circuit. FPGA is an abbreviation for Field-Programmable Gate Array.

The control circuit 21 generates a command for requesting the slave device 30 to execute a process (for example, a command for requesting data, a command for requesting execution of predetermined process, or the like), and transmits transmission data including the command to the wireless communication circuit 22 by a transmission packet. The control circuit 21 receives a packet transmitted from the slave device 30, and executes a predetermined process based on data included in the received packet. That is, the wireless communication performed by the master device 20 and the slave device 30 is packet communication.

The wireless communication circuit 22 includes an RF circuit (not shown) for wirelessly transmitting and receiving data packets. The wireless communication circuit 22 has a transmission function, which modulates a transmission signal and oscillates at a frequency of RF signal. The wireless communication circuit 22 has a reception function, which demodulates a received signal. RF is an abbreviation for radio frequency.

The wireless communication circuit 22 modulates the packet including the data output from the control circuit 21, and transmits the modulated packet to the slave device 30 via the antenna 23. The control circuit 21 outputs, to the wireless communication circuit 22, data obtained by encrypting transmission data, such as battery information request data using encryption information exchanged in connection establishment process. The connection establishment process will be described later. The wireless communication circuit 22 adds data necessary for wireless communication, such as communication control information, to the transmission packet and transmits the transmission packet. The data necessary for wireless communication includes, for example, an identifier (ID), a sequence number, a next sequence number, and an error detection code. The wireless communication circuit 22 may control a data size, a communication format, a schedule, error detection, and the like of communication between the master device 20 and the slave device 30. The controls related to communication may be performed by the control circuit 21.

The wireless communication circuit 22 receives the packet transmitted from the slave device 30 via the antenna 23 and demodulates the received packet. Then, the demodulated packet is output to the control circuit 21. The antenna 23 converts the electric signal into a radio wave and radiates the radio wave into space. The antenna 23 receives a radio wave propagating through space and converts the radio wave into an electric signal.

As illustrated in FIG. 1, the slave device 30 includes a control circuit (CNT) 31, a wireless communication circuit (WC) 32, and an antenna 33. In addition to the above-described elements, the slave device 30 includes an input/output interface and a bus line for performing wired or wireless communication with a device other than the master device 20. The control circuit 31 has the same configuration as the control circuit 21 of the master device 20. The control circuit 31 includes, for example, a processor 311 and a memory 312. The memory 312 includes, for example, a RAM and a ROM.

The control circuit 31 executes requested process (response process, such as acquiring and returning requested data, execution of requested process, and the like) in response to a request command acquired via the wireless communication circuit 32. For example, when the request command included in the received data is a transmission request for battery information, the control circuit 31 of the slave device 30 transmits the transmission request to the monitoring device of the corresponding battery stack and acquires the battery information from the monitoring device. Then, the control circuit 31 outputs encrypted data to the wireless communication circuit 32 as a response to the request. The encrypted data is encrypted using the encryption information, and includes the processing result, for example, the acquired battery information. The control circuit 31 can also execute control of devices mounted on the vehicle, for example, in accordance with the requested processing.

The wireless communication circuit 32 includes an RF circuit (not shown) for wirelessly transmitting and receiving packets. Like the wireless communication circuit 22, the wireless communication circuit 32 has a transmission function and a reception function. The wireless communication circuit 32 receives the packet transmitted from the master device 20 via the antenna 33 and demodulates the received packet. Data included in the demodulated packet is output to the control circuit 31. The wireless communication circuit 32 modulates the packet including the data output from the control circuit 31, and transmits the modulated packet to the master device 20 via the antenna 33. The wireless communication circuit 32 adds data necessary for wireless communication, such as communication control information, to the transmission packet and transmits the transmission packet.

The wireless communication circuit 32 may control a data size, a communication format, a schedule, error detection, and the like of communication between the master device 20 and the slave device 30. Controls related to the communications may be performed by the control circuit 31. The antenna 33 converts the electric signal into a radio wave and radiates the radio wave into space. The antenna 33 receives a radio wave propagating through space and converts the received radio wave into an electric signal.

FIG. 2 is a diagram illustrating an example of an electric field intensity distribution in a communication environment between the master device 20 and the slave device 30. FIG. 2 shows an electromagnetic field simulation result at a predetermined time at a predetermined frequency. Hereinafter, the electric field intensity distribution may be referred to as an electric field distribution.

In one example, the master device 20 and the slave device 30 are disposed at predetermined positions in the vehicle. When a radio wave signal of a predetermined frequency is transmitted from the master device 20 and the slave devices 30 respectively disposed at predetermined positions, a region having a high electric field intensity and a region having a low electric field intensity are generated in a use environment due to interference between a transmission wave and a reflected wave or interference with external noise. The reflected wave is generated by reflection by a metal portion of the vehicle located around the master device 20 and the slave device 30. For example, reflection may be occurred on a vehicle body, a metal housing, a harness, or the like. For this reason, in the communication environment between the master device 20 and the slave device 30, as shown in FIG. 2, multiple NULL points having high electric field intensities and multiple NULL points having low electric field intensities are generated.

In the electric field distribution with respect to the master device 20, when the slave device 30 is located in a region where the electric field intensity is low or in the vicinity thereof, there is a high possibility that the slave device 30 cannot correctly receive the wireless signal transmitted from the master device 20, and a communication error may occur. A communication channel in which such a communication error is likely to occur has a deteriorated communication quality.

When the master device 20 and the slave device 30 execute the wireless communication via one communication channel sequentially selected from multiple communication channels, since the frequencies of the respective communication channels are different from one another, the electric field distribution of each communication channel is also different from one another. As a result, the communication quality may vary throughout the multiple communication channels.

Figure 3:
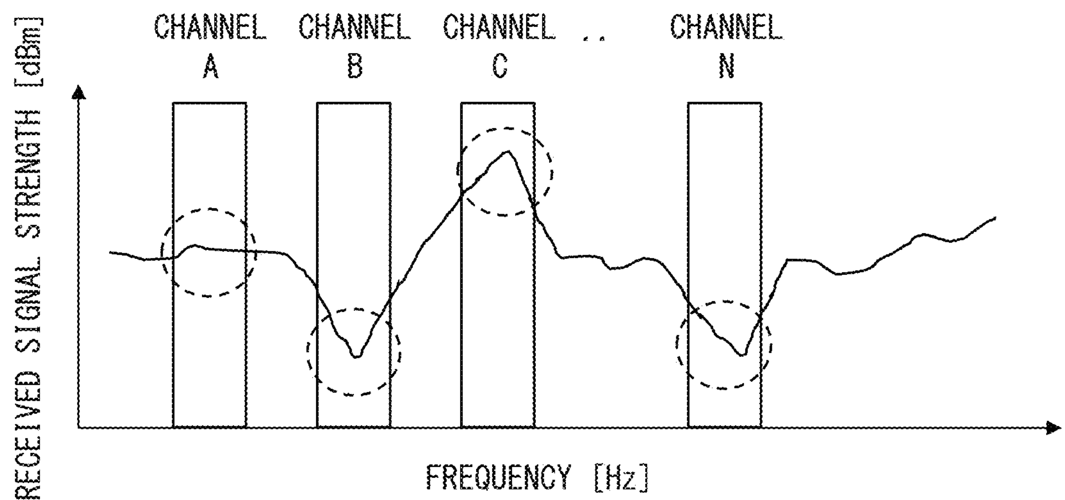
FIG. 3 is a diagram showing an example of received signal strength of each communication channel.

For example, as shown in FIG. 3, in the wireless communication via the communication channel A, a received power (received signal strength), which is one of the parameters indicating the communication quality, is relatively high. In the wireless communication via the communication channel C, the reception power indicates a very high value. Therefore, when the master device 20 and the slave device 30 use the communication channels A and C having high or very high communication quality, the master device 20 and the slave device 30 can perform high-quality wireless communication in which communication errors are sufficiently suppressed. On the other hand, in the wireless communication via the communication channels B and N, the reception power is low. For this reason, when the master device 20 and the slave device 30 use the communication channels B and N having low communication quality, the possibility of communication error occurrence in the wireless communication is increased. In FIG. 3, to facilitate understanding, an example of the received signal strength corresponding to each frequency is indicated by a solid line.

It is required that the wireless communication between the master device 20 and the slave device 30 is performed by using a communication channel capable of providing high quality wireless communication while avoiding used of a communication channel having deteriorated communication quality.

The electric field distribution between the master device 20 and the slave device 30 changes due to an external environment (external noise from outside or the like), vibration of the master device 20 and/or the slave device 30 (including vibration of a harness), or the like. Therefore, when the master device 20 and the slave device 30 are mounted on the vehicle, the electric field distribution of the communication environment between the master device 20 and the slave device 30 changes according to, for example, the state of vehicle or the state of surrounding environment of the vehicle. As a result, the communication channel with high communication quality and the communication channel with low communication quality are not fixed to a specific channel and may change every moment. Therefore, it is required to delete, in response to the deterioration of communication quality, the corresponding communication channel to be used for wireless communication from the multiple communication channels, and reset the corresponding communication channel as one of the multiple communication channels to be used for the wireless communication in response to the recovery of communication quality.

Figure 4:
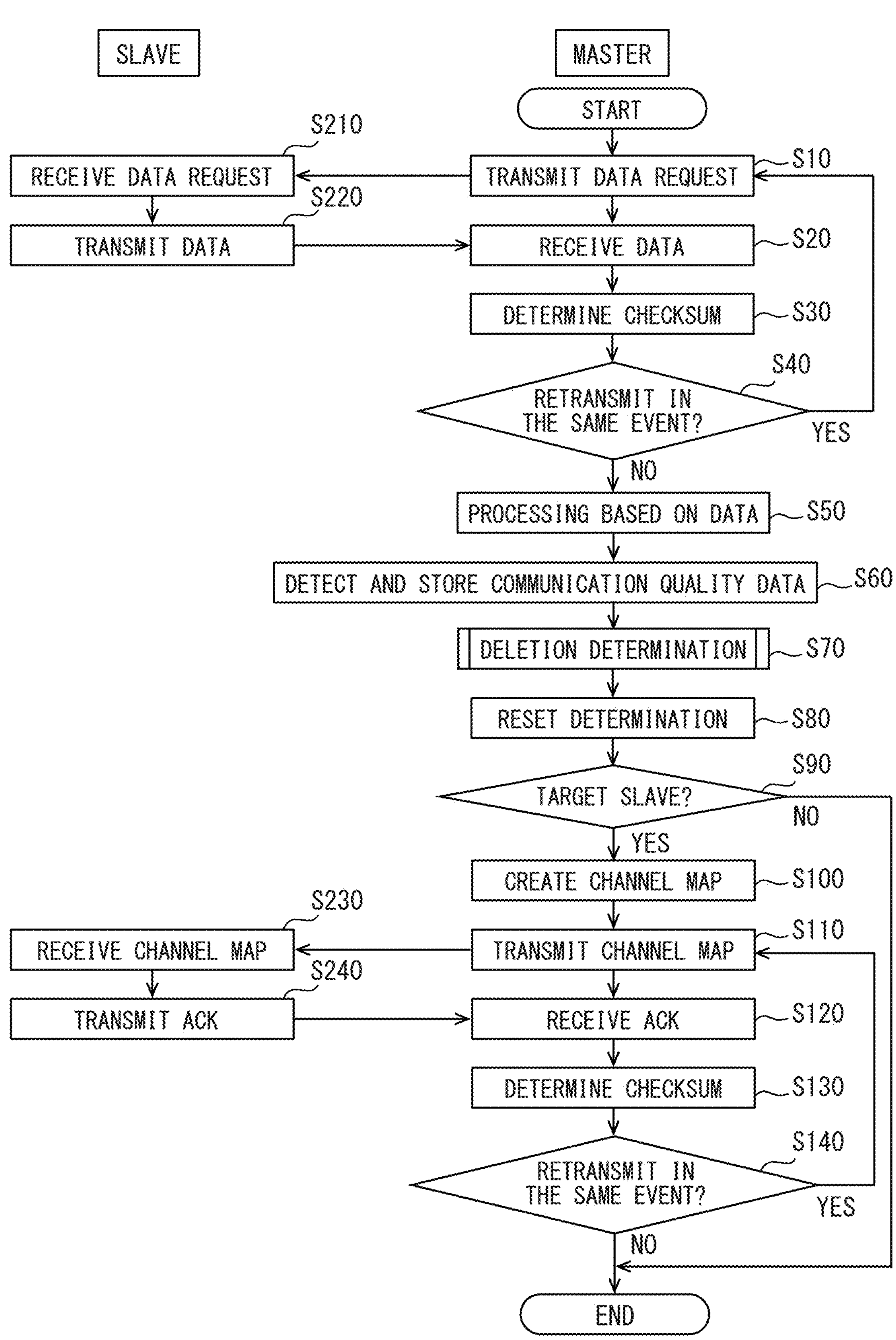
FIG. 4 is a flowchart showing a communication sequence between a master device and a slave device.

In the wireless communication system 10 of the present embodiment, a control process is executed for performing the wireless communication between the master device 20 and the slave device 30 by using, as multiple communication channels used for wireless communication, communication channels each has a ensured level of communication quality by removing a communication channel which has a deteriorated communication quality in channel map control. The details of channel map control will be described with reference to a sequence diagram shown in FIG. 4. The sequence diagram in FIG. 4 shows a communication sequence between the master device 20 and the slave device 30. In FIG. 4, the master device 20 is denoted by MASTER, and the slave device 30 is denoted by SLAVE. FIG. 4 illustrates the communication sequence executed between the master device 20 and one slave device 30. The master device 20 performs the communication sequence illustrated in FIG. 4 with respective slave devices 30.

First, the master device 20 and the slave device 30 execute a connection establishment process before executing the communication sequence illustrated in FIG. 4. For example, in a case where the wireless communication system 10 is mounted on a vehicle, the connection establishment process may be executed when an ignition signal of vehicle is switched from OFF to ON by a user operation. This connection establishment process is executed between the master device 20 and all of the slave devices 30 that correspond to connection targets of wireless communication with the master device 20. When the master device 20 and the slave device 30 establish a constant connection, the connection establishment process is performed only once at a predetermined time. When an error occurs during communication and the wireless communication connection between the master device 20 and the slave device 30 is disconnected, the connection establishment process may be executed for reconnection.

In the connection establishment process, the slave device 30 executes an advertising operation of transmitting an advertising signal via a communication channel for advertising use. The master device 20 executes a scanning operation of scanning the advertising signals. The communication channels for advertising operation may be multiple (for example, three in the case of Bluetooth LE). When the master device 20 receives the advertising signal by the scanning operation, the master device 20 transmits a connection request to the slave device 30 that has transmitted the corresponding advertising signal. Accordingly, a communication connection is established between the master device 20 and the slave device 30. Further, after the communication connection is established, the master device 20 and the slave device 30 exchange encryption information and perform a sharing process of initial information related to frequency channel hopping. The initial information includes, for example, a hopping pattern or a function for hopping.

When the connection establishment process ends, for each communication event that occurs periodically, the master device 20 and the slave device 30 execute data communication via a data communication channel sequentially selected from multiple communication channels. The master device 20 allocates communication periods to the multiple slave devices 30 in order, so that communication events with the multiple slave devices 30 occur in a predetermined order.

As illustrated in FIG. 4, in S10, the master device 20 transmits, for example, a data request command, that is, a data request, to the slave device 30. When the slave device 30 receives the data request in S210, the slave device 30 executes a predetermined process necessary for making a response to the data request, that is, a process of acquiring and transmitting the requested data in S220.

The master device 20 and the slave device 30 perform frequency channel hopping for each communication event to switch a communication channel for data to be used, and perform transmission and reception of a data request and transmission and reception of requested data. At this time, the master device 20 and the slave device 30 determine a communication channel to be switched by frequency channel hopping, for example, according to a channel map to be described later. In the case of Bluetooth LE, 37 communication channels (also referred to as data channel) are prepared for data communication.

In S20, the master device 20 receives the requested data. Then, in S30, the master device 20 performs, for example, checksum determination based on error detection code included in the received data in order to confirm whether the data has been correctly received. In subsequent S40, in response to determining in S30 that the data is not correctly received, the master device 20 determines whether to execute a process for retransmission in the same communication event. For example, the master device 20 may determine to perform retransmission when there is enough time to perform retransmission until the end time of the current communication event. The maser device 20 may determine not to perform retransmission when there is not enough time to perform retransmission. In S40, when the master device 20 determines to perform retransmission, the master device 20 returns to S10 and repeats the process from S10. In response to determining that the data has been correctly received in S30 and determining that retransmission is not necessary in S40, the master device 20 proceeds to S50.

In S50, the master device 20 executes a process based on the information included in the received data. In response to determining in S30 that the data is not correctly received and determining in S40 that retransmission is not to be performed, the process may omit S50 or execute S50 based on the previously received data.

In S60, the master device 20 detects the received signal strength indicator (RSSI) and the packet error rate (PER) as the characteristic data indicating the communication quality of the signal received from the slave device 30. The RSSI is an index indicating the strength of a signal transmitted from the slave device 30 and received by the master device 20. The PER indicates a ratio of the number of error packets to the number of entire received packets by the master device 20 in percentage. The master device 20 may detect a signal noise ratio (SNR)/signal interference noise ratio (SINR) instead of the RSSI. The SNR/SINR can be detected by, for example, a ratio between an RSSI value when the master device 20 receives a radio signal from the slave device 30 and an RSSI value when the master device 20 does not receive a radio signal. The master device 20 may detect a bit error rate (BER) or a packet arrival rate (PAR) instead of the PER. The master device 20 stores and accumulates the detected RSSI or SNR/SINR and PER or BER for each communication channel. Note that, in addition to or instead of the detection by the master device 20 as described above, the characteristic data indicating the communication quality can also be acquired by the slave device 30 by detecting an RSSI, a PER, or the like when receiving a signal from the master device 20 and transmitting the RSSI, the PER, or the like to the master device 20.

In S70, the master device 20 determines a deterioration in the communication quality of the communication channel used for wireless communication with the slave device 30 based on the characteristic data indicating the communication quality of the communication channel detected in S60. Then, the master device 20 deletes the communication channel having the communication quality determined to be deteriorated from the communication channels to be used for wireless communication between the master device 20 and the slave device 30. The communication channel to be deleted is a communication channel to be used for data communication. Details of the communication channel deletion determination process will be described later.

In S80, the master device 20 executes the reset determination of communication channel that has been deleted by the deletion determination at the time of communication event. In this reset determination, when a predetermined reset condition is satisfied, the deleted communication channel is reset as a communication channel to be used for wireless communication. For example, as an example of the predetermined reset condition, the deleted communication channel may be reset when a predetermined period elapses after the deletion of communication channel. Alternatively, as another example of the predetermined reset condition, the deleted communication channel may be reset as the communication channel to be used for wireless communication in response to the fact that the communication channel adjacent to the deleted communication channel exhibits high communication quality. In this way, the communication channel determined to be resettable as the communication channel to be used for wireless communication is included into the channel map, and is actually used for the wireless communication between the master device 20 and the slave device 30. However, when the communication quality at the time of actual use in the wireless communication is still low, the reset communication channel may be set to a deletion target again by the deletion determination.

In S90, the master device 20 determines whether the slave device 30 that has performed the wireless communication is the slave device selected as the execution target of channel map control. The channel map control in the present embodiment means a control process of creating a channel map in S100 based on the result of deletion determination of the communication channel in S70 and the result of the reset determination of deleted communication channel in S80 so that only the communication channel providing a certain ensured level of communication quality is included in the channel map. That is, the process executed in S70, S80, and S100 correspond to a communication channel determination process.

In S90, in response to determining that the slave device 30 is to be selected as the execution target of channel map control, the master device 20 proceeds to S100. In S90, in response to determining that the slave device 30 is not to be selected as the execution target of channel map control, the master device 20 ends the process illustrated in the flowchart of FIG. 4 without executing the channel map control. Therefore, the channel map of slave device 30, which is not selected as the execution target of channel map control, is not changed by the channel map control.

In S100, the master device 20 creates a channel map based on the deletion determination result in S70 and the reset determination result in S80. In the present embodiment, individual channel maps are created for respective slave devices 30. It is also possible to create a common channel map for multiple slave devices 30. In creation of a common channel, an AND operation of the communication channels included in the channel map of the slave device 30 to be subjected to the channel map control may be performed to extract multiple communication channels common to all the channel maps. In this case, the processing load of creating common channel map can be reduced by excluding the channel map of the slave device 30 that is not selected as the execution target of channel map control.

The channel map may indicate one or more communication channels that can be used for wireless communication, or may indicate one or more communication channels that cannot be used for wireless communication. Further, the channel map may indicate both of the usable communication channel and the unusable communication channel. When the usable/unusable communication channel is changed by the creation of channel map, the frequency channel hopping pattern may be updated. When the frequency channel hopping pattern is not updated or when the communication channel planned to be hopped cannot be used, the communication channel planned to be hopped in next time may be used.

In S110, the master device 20 transmits the channel map created in the channel map creation process to the slave device 30. At this time, regardless of the individual channel map or the common channel map, the master device 20 transmits the channel map only to the slave device 30, which is determined as the execution target of channel map control in S90. The master device 20 may transmit the channel map by simultaneous transmission to all of the slave devices 30 including the slave device 30 which is not determined as the execution target of channel map control in S90. The slave device 30 that is not determined as the execution target of the channel map may discard the channel map transmitted from the master device 20.

In S230, the slave device 30 receives the channel map transmitted from the master device 20. In S240, the slave device 30 returns a reception confirmation signal (Ack signal) to the master device 20. In S120, the master device 20 receives the Ack signal from the slave device 30. Then, in S130, the master device 20 performs, for example, checksum determination based on the error detection code included in the received Ack signal in order to confirm whether or not the Ack signal has been correctly received. In subsequent S140, in response to determining in S130 that the data is not correctly received, the master device 20 determines whether to execute a process for retransmission in the same communication event. In S140, when the master device 20 determines to perform retransmission, the master device 20 returns S110 and repeats the process from S110 again. In response to determining in S130 that the data has been correctly received or in response to determining in S140 that retransmission is not performed, the master device 20 ends the process illustrated in the flowchart of FIG. 4.

As described above, the master device 20 and the slave device 30 share the channel map. The master device 20 may execute the process in S70 to S140 as described above for each communication event, or may execute the process in S70 to S140 every time multiple communication events are occurred. The process in S70 to S100 may be executed by a processing device other than the master device 20, and the processing result may be provided to the master device 20.

Figure 5:
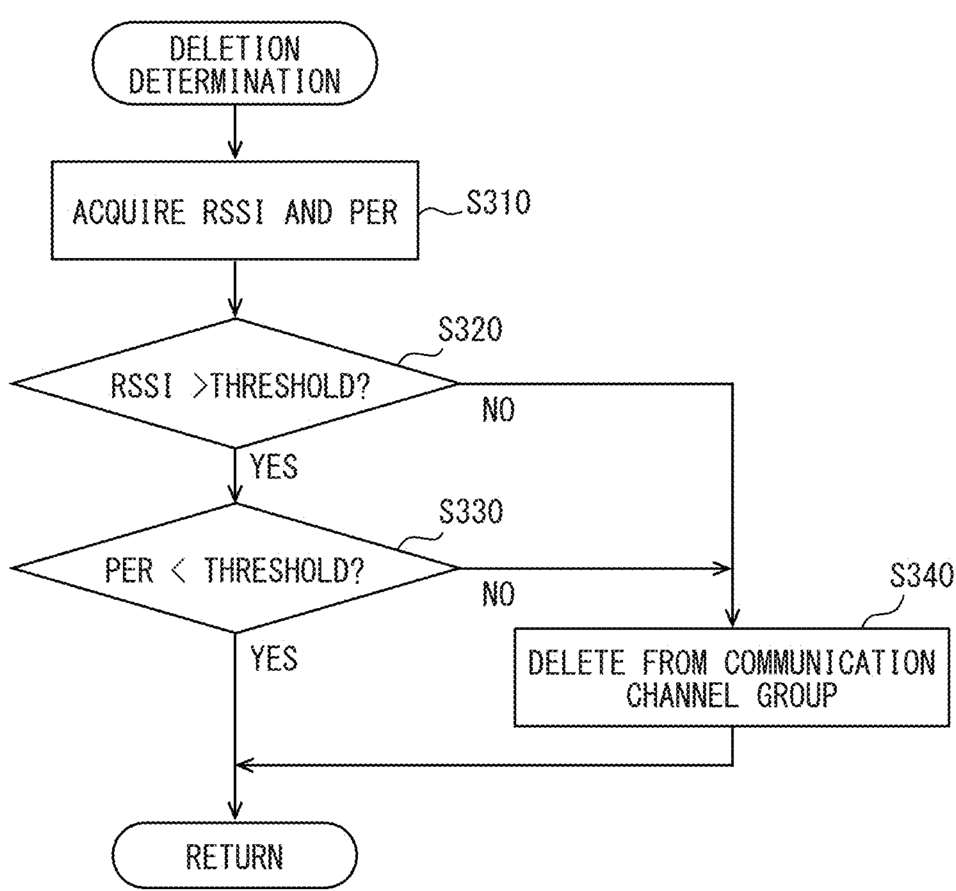
FIG. 5 is a flowchart showing an example of communication channel deletion determination process.

The above-described communication channel deletion determination processing will be described with reference to the flowchart of FIG. 5. The flowchart of FIG. 5 illustrates an example of communication channel deletion determination process.

In S310, the master device 20 acquires, for example, an RSSI value and a PER value as data indicating the communication quality of the communication channel used for wireless communication. A larger RSSI value indicates higher communication quality, and a smaller PER value indicates lower communication quality. The RSSI value and the PER value may be the RSSI value and the PER value detected in S60 when the communication channel was used in the last wireless communication, or may be values obtained by averaging a predetermined number of RSSI values and PER values detected in multiple wireless communications performed in the past, or may be median values instead of the average values.

In S320, the master device 20 determines whether the acquired RSSI value satisfies an RSSI threshold value, that is, whether the acquired RSSI value is larger than the RSSI threshold value. In this determination process, in response to determining that the RSSI value satisfies the RSSI threshold value, the master device 20 proceeds to S330. In response to determining that the RSSI value does not satisfy the RSSI threshold value, the master device 20 proceeds to S340.

In S330, the master device 20 determines whether the acquired PER value satisfies a PER threshold value, that is, whether the acquired PER value is smaller than the PER threshold value. In this determination process, in response to determining that the PER value satisfies the PER threshold value, the deletion determination process is ended. In this case, it can be considered that the communication quality of the communication channel is not deteriorated, and thus the communication channel is not deleted from the communication channel group which is a set of usable communication channels. In S330, in response to determining that the PER value does not satisfy the PER threshold value, the master device 20 proceeds to S340.

In S340, the process acquires a result of comparing the RSSI value with the RSSI threshold value or a result of comparing the PER value with the PER threshold value. Since either the RSSI value or the PER value does not satisfy the threshold value, the master device 20 deletes the communication channel from the communication channel group. The communication channel group is a set of communication channels whose RSSI values are larger than the RSSI threshold value and whose PER values are smaller than the PER threshold value. In other words, the communication channel group is a set of communication channels determined to have high communication qualities based on the RSSI values and the PER values.

As described above, in the deletion determination process, when both the RSSI value and the PER value satisfy the respective threshold values corresponding to the predetermined communication quality criterion, the communication channel is regarded as satisfying the predetermined communication quality criterion and remains as one communication channel of the communication channel group. When at least one of the RSSI value or the PER value does not satisfy the corresponding threshold value, the communication channel is considered not to satisfy the predetermined communication quality criterion and is removed from the communication channel group.

In the reset determination process of S80 in the flowchart of FIG. 4, the process determines whether the communication channel deleted in the deletion determination process satisfies the reset condition. In response to determining that the deleted communication channel satisfies the reset condition, the deleted communication channel is included in the communication channel group. Then, in the channel map creation process of S100, a channel map is created based on the communication channel group generated after execution of the deletion determination process and the reset determination process.

The following will describe a process of selecting the slave device 30, which corresponds to an execution target of channel map control, in detail with reference to the flowchart of FIG. 6. The process shown in the flowchart of FIG. 6 is repeatedly executed at a predetermined cycle.

In S410, the master device 20 determines whether it is time to review the selection of the slave device 30, which corresponds to an execution target of channel map control. In the present embodiment, the review timing may be set at a regular cycle or at an irregular cycle. As described above, in the present embodiment, the selection of slave device 30, which corresponds to the execution target of channel map control, is reviewed at the regular cycle (periodic review time) and at the irregular cycle (non-periodic review time). Therefore, the slave device 30 selected as the execution target of channel map control is not fixed to one channel and is variable with the elapse of time. For this reason, it is possible to suppress the occurrence of a situation in which only a specific slave device 30 is excluded from the execution target of channel map control, and thus, communication with the master device 20 is continuously performed via the communication channel, which has the deteriorated communication quality.

For example, the periodic review time can be set every time the master device 20 and each of the multiple slave devices 30 perform communication by a predetermined number of times (for example, eight times). When the periodic review time arrives, the master device 20 proceeds to S420.

Regarding the irregular review time, it can be considered that the irregular review time has come when a change occurs in at least one of the state of vehicle or the state of surrounding environment of the vehicle. This is because when at least one of the state of vehicle or the state of surrounding environment of the vehicle changes, there is a high possibility that the communication environment between the master device 20 and the multiple slave devices 30 changes accordingly. Then, when at least one of the state of vehicle or the state of surrounding environment of the vehicle changes, the slave device 30, which is the execution target of channel map control, is selected again based on the communication quality data of each slave device 30 after the change, so that optimum selection can be performed based on the communication quality data corresponding to the state after change.

The change occurred in the state of vehicle can be determined by, for example, turn-on or turn-off of an ignition switch of the vehicle indicating whether the vehicle is started or not. This is because an operation state of a device mounted on the vehicle changes between when the ignition switch of the vehicle is turned on and when the ignition switch is turned off. The presence or absence of noise from the device changes according to turn-on or turn-off state of the device. Further, since the vibration state of vehicle changes depending on whether or not the vehicle is started, the electric field intensity distribution between the master device 20 and the multiple slave devices 30 changes accord to the vibration state of vehicle. For the same reason, a change in the state of vehicle can also be determined by turning on/off a device (for example, an air conditioner) mounted on the vehicle or performing/stopping wireless communication with a wireless device mounted on the vehicle. Furthermore, recently, passengers other than the driver often carry a digital key for smart entry or a digital device (such as a smartphone) having a communication function. Therefore, a change in the state of vehicle may be determined based on the presence or absence of a passenger.

When the speed of the vehicle changes, the vibration state of vehicle also changes. Thus, a change in the state of vehicle may also be determined based on a change in the vehicle speed. When the change in the state of vehicle is determined based on the change in vehicle speed, for example, the vehicle speed may be divided into several ranges (for example, 30 km or lower, 30 km to 60 km, 60 km or higher, and the like). When the vehicle speed exceeds one of the divided ranges, it may be determined that the state of vehicle is changed. Further, the vibration state of vehicle in the vertical, horizontal, or longitudinal direction may be directly or indirectly detected using various sensors (an acceleration sensor, a gyro sensor, and the like), and a change in the state of vehicle may be determined in response to a change in a magnitude of the detected vibration state increasing to a value equal to or higher than a reference value or decreasing to a value equal to or lower than a reference value.

The hardware characteristics of wireless communication system 10 changes depending on the temperature of vehicle. Therefore, the temperature of vehicle may be detected by a temperature sensor mounted on the vehicle or by a temperature of a device (for example, a battery) mounted on the vehicle. Then, a change in the state of vehicle may be determined based on a change in the temperature of the vehicle.

When a travel distance of the vehicle increases by a predetermined distance, there is a high possibility that the travel environment of the vehicle has changed. When the travel environment of the vehicle changes, the influence of interference on the wireless communication between the master device 20 and the multiple slave devices 30 may also change. Therefore, it may be determined that the state of vehicle has changed every time the travel distance of the vehicle increases to a predetermined distance.

The change in the state of surrounding environment of the vehicle may be determined from the change in the environmental temperature of the vehicle for the same reason as described above. The environmental temperature of the vehicle may be acquired, for example, from an information center by performing a communication with an information source located outside the vehicle.

A high moisture density in the air hinders radio wave propagation. Thus, the electric field intensity distribution between the master device 20 and the multiple slave devices 30 may change according to the humidity of the surrounding environment of the vehicle. Therefore, the humidity of the surrounding environment of the vehicle may be detected (estimated) from the humidity around the vehicle detected by the humidity sensor, the operation state (rain) of the wiper, the operation state (fog) of the fog lamp, weather information acquired from an external server, or the like. Then, a change in the state of surrounding environment of the vehicle may be determined from a change in the detected humidity.

Depending on the position of vehicle, there may be many radio waves that become interference waves (for example, near a radio tower). When there are many radio waves serving as interference waves, a noise floor increases or intermodulation distortion occurs. Therefore, a change in the state of surrounding environment of the vehicle may be determined based on whether the position of vehicle is in an area where many radio waves serve as interference waves. In response to determining that the position of vehicle belongs to an area where many radio waves serve as interference waves, the update of channel map may be stopped. In consideration of a case where the occupant carries a digital key, the change in the state of surrounding environment of the vehicle may be determined based on whether the occupant is approaching the vehicle.

When the irregular review time arrives, the master device 20 proceeds to S420 as in the case where the regular review time arrives. In response to determining that neither the regular review time nor the irregular review time has arrived, the master device 20 ends the process illustrated in the flowchart of FIG. 6.

In S420, the master device 20 acquires communication quality data related to wireless communication with each slave device 30. The communication quality data includes at least one of a packet error rate (PER), a bit error rate (BER), a packet arrival rate (PAR), a received signal strength indicator (RSSI), a signal-to-noise ratio (SNR), and a signal interference noise ratio (SINR).

In response to determining that the periodic review time has arrived, communication quality data of multiple communications detected between the previous periodic review time and the current periodic review time are acquired as the communication quality data. In order to emphasize latest communication quality data, the latest communication quality data may be assigned to a higher weight coefficient. Alternatively, the communication for which the communication quality data is acquired may be limited to a previous predetermined number from the latest communication.

In response to determining that the irregular review time has arrived, communication quality data of at least one communication, preferably multiple time communications, detected immediately after the irregular review time has arrived is acquired as the communication quality data. The acquired communication quality data may include communication quality data acquired immediately before the irregular review timing arrives. This is because the state immediately before the irregular review timing arrives is close to the state of vehicle and/or the state of surrounding environment of the vehicle after occurrence of change.

In S430, based on the communication quality data acquired in S420, the slave device communication quality indicating the communication quality of each slave device 30 is calculated. As the slave device communication quality, the master device 20 may calculate, for example, an average value of at least one of PER, BER, PAR, RSSI, SNR, and SINR detected in multiple communications. When the slave device communication quality is obtained from the result of one communication, PER, BER, PAR, RSSI, SNR, or SINR detected in the one communication may be used as the slave device communication quality. Alternatively, as the slave device communication quality, the master device 20 may calculate the number of communication channels usable for the wireless communication from the number of communication channels included in the communication channel group corresponding to each slave device 30.

In FIG. 7, (a) illustrates an example in which the PER, the RSSI, and the number of communication channels usable for wireless communication are obtained as the slave device communication quality of each slave device 30 when four slave devices 30 are provided.

In S440, the master device 20 ranks the multiple slave devices 30 according to the slave device communication quality calculated in S430. For example, in the case of the example illustrated in (a) of FIG. 7, when the slave devices 30 are ranked in descending or ascending order of communication quality based on at least one index of PER, RSSI, and the number of communication channels usable for wireless communication, the result illustrated in (b) of FIG. 7 is acquired. That is, the slave device 30 assigned with the slave number S2 has the worst communication quality, and the communication quality becomes better in the order of the slave device 30 assigned with the slave number S3, the slave device 30 assigned with the slave number S4, and the slave device 30 assigned with the slave number S1.

In a case where the order of communication quality of each slave device 30 is inconsistent in multiple indexes, the communication quality of each slave device 30 may be ranked by majority decision based on three or more indexes.

Figures 8, 9:
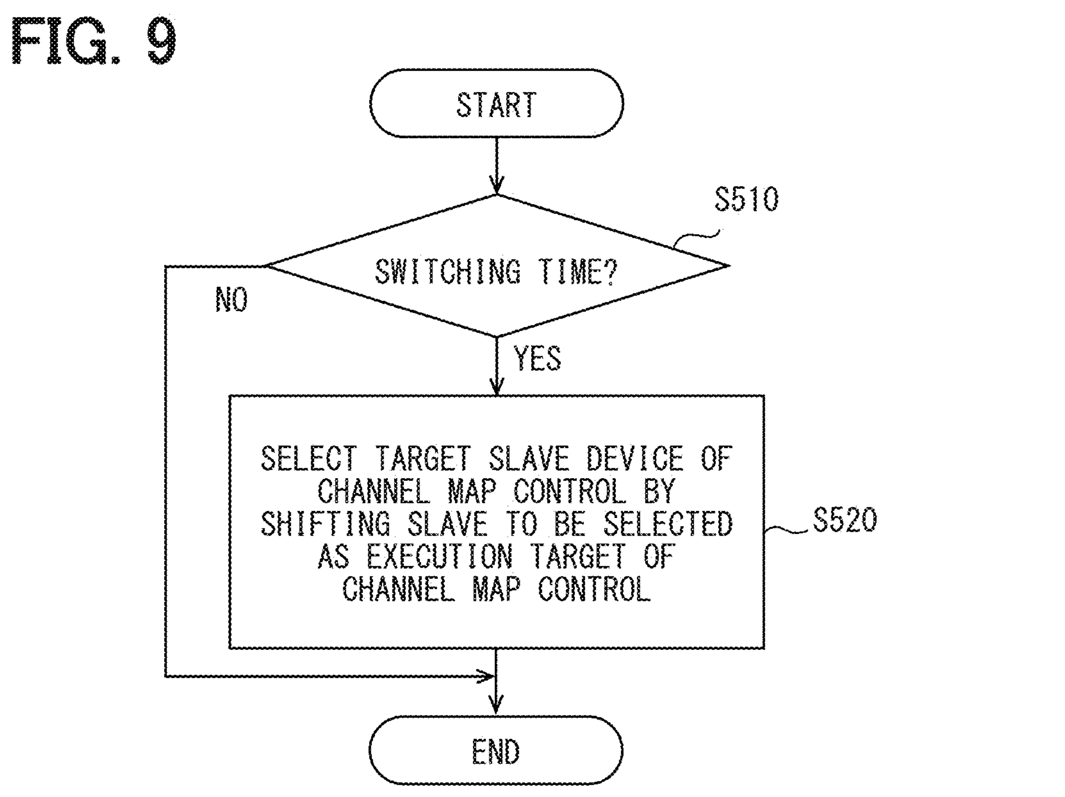
FIG. 8 is another schematic diagram for explaining the process shown in the flowchart of FIG. 6.
FIG. 9 is a flowchart showing a process of selecting a slave device as a target of channel map control in a second embodiment.

In S450, the master device 20 selects a predetermined number of slave devices 30 as execution targets of the channel map control based on the result of ranking in S440. Specifically, the master device 20 selects a predetermined number of slave devices 30 smaller than the total number of slave devices 30 in ascending order of communication quality according to the ranking of each slave device 30, and sets the selected predetermined number of slave devices 30 as the execution targets of the channel map control. For example, in the example illustrated in (b) of FIG. 7, three slave devices 30 assigned with slave numbers S2, S3, and S4 may be selected from entire four slave devices 30 in ascending order of communication quality, and are set as the execution targets of the channel map control. This is because the slave device 30 having a lower communication quality has a higher necessity of selecting a communication channel satisfying a certain communication quality standard by the channel map control. As a result, as shown in FIG. 8, the slave device 30 assigned with the slave number S1 is excluded from the channel map control. The slave device 30 assigned with the slave number S1 can communicate with the master device 20 with the best communication quality among the multiple slave devices 30. Therefore, even when the channel map control is not performed, it is expected that the communication with the master device 20 is continuously performed with a certain communication quality.

As described above, in the wireless communication system 10 according to the present embodiment, the ranking of communication quality for each slave device 30 is updated regularly or irregularly. Every time the ranking of communication quality of each slave device 30 is updated, the master device 20 reselects the slave device 30 corresponding to the execution target of channel map control. Therefore, it is possible to select the optimum slave device 30 as the execution target of channel map control at each moment in response to a change in the communication environment between the master device 20 and each slave device 30 that changes from moment to moment. Accordingly, in the wireless communication system 10 according to the present embodiment, it is possible to ensure the quality of wireless communication between the master device 20 and each slave device 30 without performing channel map control for all of the slave devices 30 at the same time. Therefore, even though the slave device 30 is added later or the number of the original slave devices 30 is large, it is not necessary to use the high-performance master device 20 that can properly execute the channel map control for all of the slave devices 30 at the same time. Therefore, it is possible to suppress an increase in cost of the wireless communication system.

Second Embodiment

The following will describe a wireless communication system 10 according to a second embodiment of the present disclosure with reference to the drawings. The wireless communication system 10 according to the present embodiment has a similar configuration to that of the wireless communication system 10 according to the first embodiment, and thus description of the similar configuration will be omitted.

The wireless communication system 10 according to the first embodiment ranks the communication quality of each slave device 30 at the regular or irregular review time, and selects the slave device 30 as the execution target of channel map control according to the raking result. In the wireless communication system 10 according to the second embodiment, regardless of the communication quality of each slave device 30, the predetermined number of slave devices 30 set as execution target of channel map control are shifted among the multiple slave devices 30 in each switching cycle, and the frequencies at which the multiple slave devices 30 are set as execution targets of channel map control are equalized. Therefore, the wireless communication system 10 according to the second embodiment is different from the wireless communication system 10 according to the first embodiment only in the process of selecting the slave device 30 as execution target of channel map control. Hereinafter, a process of selecting the slave device 30 as execution target of channel map control in the wireless communication system 10 of the present embodiment will be described with reference to the flowchart of FIG. 9. The process illustrated in the flowchart of FIG. 9 is repeatedly executed at intervals equal to or shorter than the switching cycle.

In S510, the master device 20 determines whether a predetermined switching period has elapsed and a switching time for switching a predetermined number of slave devices 30 as execution targets of channel map control has arrived. In response to determining that the switching timing has arrived, the master device 20 proceeds to S520. In response to determining that the switching timing has not arrived, the master device 20 ends the process illustrated in the flowchart of FIG. 9.

In S520, the master device 20 selects the slave devices 30 to be set as execution targets of channel map control by shifting a predetermined number of slave devices 30 to be selected as execution targets of channel map control among the multiple slave devices 30.

For example, in tan example illustrated in FIG. 10, four slave devices 30 are provided, and three slave devices 30 assigned with slave numbers of S1, S2, and S3 are selected at the time when the first switching cycle has elapsed. Then, at the time when the second switching cycle has elapsed, the three slave devices 30 assigned with the slave numbers of S2, S3, and S4 are selected. Thereafter, in the same manner, the predetermined number of slave devices 30 to be selected as execution targets of channel map control are shifted such that the slave number of slave device 30 to be selected is shifted by one every time the switching period elapses.

Since the switching cycle is constant, as shown in FIG. 10, by shifting a predetermined number of slave devices 30 to be selected as execution targets of the channel map control every time the switching cycle elapses, the frequencies at which the multiple slave devices 30 are selected as execution targets of channel map control can be substantially equalized. Therefore, each slave device 30 can perform communication via the communication channel satisfying the predetermined communication quality standard during the period in which the channel map control is performed. Therefore, even though there is a difference in slave communication quality among the multiple slave devices 30, it is possible to ensure constant communication reliability for all of the slave devices 30.

Although embodiments of the present disclosure have been described above, the present disclosure is not limited to the above-described embodiments, and various modifications can be made without departing from the spirit of the present disclosure.

For example, in the first embodiment described above, when a decrease in communication quality is determined based on communication quality data (RSSI value, PER value, or the like) of a communication channel, only the communication channel for which a decrease in communication quality is determined is deleted.

The communication channel, which is determined to have deteriorated communication quality and is deleted from the communication channels for performing the wireless communication between the master device 20 and the slave device 30, may include a neighboring communication channel of the corresponding communication channel in addition to the communication channel, which may be directly determined to have deteriorated communication quality based on the detected characteristic data (RSSI value, PER value, or the like). The reason is because when a determination is made that one communication channel has deteriorated communication quality, usually, there is a high possibility that the communication quality of the communication channel of the nearby frequency shows a similar tendency. In this case, for example, the number of communication channels to be deleted may be increased in a case where both the RSSI value and the PER value do not satisfy the threshold compared with a case where either one of the RSSI value or the PER value does not satisfy the threshold.

What is claimed is:

1. A wireless communication system comprising:

a master device;

a plurality of slave devices, each of which executing a wireless communication with the master device using a communication channel sequentially selected from multiple communication channels;

a communication channel determination unit determining, in the wireless communication between the master device and each of the plurality of slave devices, a communication quality of each of the multiple communication channels, the communication channel determination unit determining at least one target communication channel to be used for the wireless communication based on a determination result of the communication quality of each of the multiple communication channels; and a selection unit selecting, from the plurality of slave devices, an execution target of communication channel determination performed by the communication channel determination unit, wherein the selection unit repeatedly selects, from the plurality of slave devices, the execution target of communication channel determination.

2. The wireless communication system according to claim 1, wherein, for the execution target selected from the plurality of slave devices, in response to determining that the communication quality of one of the multiple communication channels is deteriorated, the communication channel determination unit determines the at least one target communication channel to be used for the wireless communication to exclude the one of the multiple communication channels determined to have deteriorated communication quality.

3. The wireless communication system according to claim 2, wherein the communication channel determination unit determines whether the communication channel, which is excluded from the at least one target communication channel to be used for the wireless communication due to determination of deteriorated communication quality, is resettable as the at least one target communication channel to be used for the wireless communication, and the communication channel determination unit resets the communication channel, which is excluded from the at least one target communication channel to be used for the wireless communication due to determination of deteriorated communication quality, as the at least one target communication channel to be used for the wireless communication in response an affirmative determination.

4. The wireless communication system according to claim 1, wherein the selection unit includes a ranking unit that ranks the communication quality of each of the plurality of slave devices when each of the plurality of slave devices performs the wireless communication with the master device, and the selection unit selects the execution target from the plurality of slave devices based on a ranking result of the communication quality of each of the plurality of slave devices determined by the ranking unit.

5. The wireless communication system according to claim 4, wherein the selection unit selects, from the plurality of slave devices, a predetermined number of slave devices in ascending order of the communication quality based on the ranking result of the communication quality of each of the plurality of slave devices determined by the ranking unit, and the selection unit sets selected predetermined number of slave devices as the execution target.

6. The wireless communication system according to claim 4, wherein the ranking unit periodically updates the ranking result of the communication quality of each of the plurality of slave devices, and the selection unit reselects the execution target every time the raking unit updates the ranking result of the communication quality of each of the plurality of slave devices.

7. The wireless communication system according to claim 4, wherein, when each of the plurality of slave devices performs the wireless communication with the master device, the ranking unit ranks the communication quality of each of the plurality of slave devices based on at least one of (i) a packet error rate, (ii) a bit error rate, (iii) a packet arrival rate, (iv) a received signal strength indicator, (v) a signal-to-noise ratio, or (vi) a signal interference noise ratio.

8. The wireless communication system according to claim 4, wherein the ranking unit ranks the communication quality of each of the plurality of slave devices based on a quantity of the multiple communication channels usable for the wireless communication in each of the plurality of slave devices.

9. The wireless communication system according to claim 4, wherein the master device or the plurality of slave devices are mounted on a moving body, the ranking unit updates the ranking result of the communication quality of each of the plurality of slave devices in response to a change occurs in at least one of (i) a state of the moving body or (ii) a state of surrounding environment of the moving body, and the selection unit reselects the execution target from the plurality of slave devices every time the ranking unit updates the ranking result of the communication quality of each of the plurality of slave devices.

10. The wireless communication system according to claim 9, wherein the change occurred in the state of the moving body is determined based on at least one of:

(i) presence or absence of activation of the moving body;

(ii) presence or absence of activation of a device mounted on the moving body;

(iii) presence or absence of wireless communication by a wireless device mounted on the moving body;

(iv) a speed of the moving body;

(v) a travel distance of the moving body;

(vi) a temperature of the moving body; or (vii) a vibration of the moving body.

11. The wireless communication system according to claim 9, wherein the change occurred in the state of surrounding environment of the moving body is determined based on at least one of:

(i) an environment temperature of the moving body;

(ii) an environment humidity of the moving body;

(iii) a position of the moving body; or (iv) an approach of an occupant to the moving body.

12. The wireless communication system according to claim 1, wherein the selection unit shifts the slave device to be selected as the execution target among the plurality of slave devices for each switching cycle to equalize frequencies at which the plurality of slave devices are selected as the execution target.

13. A wireless communication method, which executes a wireless communication between a master device and a plurality of slave devices; each of the plurality of slave devices executing a wireless communication with the master device using a communication channel sequentially selected from multiple communication channels, the wireless communication method comprising:

determining, in the wireless communication between the master device and each of the plurality of slave devices, a communication quality of each of the multiple communication channels;

determining at least one target communication channel to be used for the wireless communication based on a determination result of the communication quality of each of the multiple communication channels; and repeatedly selecting, from the plurality of slave devices, an execution target of determination of the at least one target communication channel to be used for the wireless communication.

14. A wireless communication system comprising:

a master device;

a plurality of slave devices, each of which executing a wireless communication with the master device using a communication channel sequentially selected from multiple communication channels;

a computer-readable non-transitory storage medium; and a microcomputer, by executing a program stored in the computer-readable non-transitory storage, configured to:

determine, in the wireless communication between the master device and each of the plurality of slave devices, a communication quality of each of the multiple communication channels;

determine at least one target communication channel to be used for the wireless communication based on a determination result of the communication quality of each of the multiple communication channels; and repeatedly select, from the plurality of slave devices, an execution target of determination of the at least one target communication channel to be used for the wireless communication.

* * * * *